United States Patent
Agus

(10) Patent No.: US 6,245,143 B1
(45) Date of Patent: Jun. 12, 2001

(54) MORTAR COMPOSITION FOR APPLICATION OF A REGENERATING AND PROTECTIVE COATING ON CEMENTITIOUS MATERIALS AND PROCESS FOR THE PREPARATION THEREOF

(76) Inventor: Patrizio Agus, Via Diaz, 65, Quartu S.Elena (IT)

( * ) Notice: Subject to any disclaimer, the term of this patent is extended or adjusted under 35 U.S.C. 154(b) by 0 days.

(21) Appl. No.: 09/109,074

(22) Filed: Jul. 2, 1998

Related U.S. Application Data

(63) Continuation-in-part of application No. PCT/IB96/01450, filed on Dec. 18, 1996.

(30) Foreign Application Priority Data

Jan. 9, 1996 (IT) .............................................. CA96A0001

(51) Int. Cl.⁷ ............................ C04B 24/24; C04B 14/06
(52) U.S. Cl. ......................... 106/802; 106/724; 106/737; 106/819; 106/823; 524/2
(58) Field of Search .................................. 106/724, 737, 106/802, 819, 823; 524/2

(56) References Cited

FOREIGN PATENT DOCUMENTS

| | | |
|---|---|---|
| 0182543 | 5/1986 | (EP) . |
| 455940 | * 9/1994 | (EP) . |

OTHER PUBLICATIONS

WPIDS Abstract No. 80–15390C, abstract of Japanese Patent Specification No. 55–007309. (Jan. 1980).*
WPIDS Abstract No. 83–31215K, abstract of Japanese Patent Specification No. 58–029970. (Feb. 1983).*
WPIDS Abstract No. 83–53026K, abstract of Japanese Patent Specification No. 58–069272. (Apr. 1983).*
WPIDS Abstract No. 84–053776, abstract of Japanese Patent Specification No. 59–013685. (Jan. 1984).*
WPIDS Abstract No. 90–212034, abstract of Japanese Patent Specification No.02–140700. (May 1990).*
WPIDS Abstract No. 90–221845, abstract of Japanese Patent Specification No. 02–151797. (Jun. 1990).*
WPIDS Abstract No. 96–283673, abstract of Japanese Patent Specification No. 08–120192. (May. 1996).*

* cited by examiner

*Primary Examiner*—Anthony Green
(74) *Attorney, Agent, or Firm*—Stevens, Davis, Miller & Mosher, LLP

(57) ABSTRACT

A mortar composition for application of a regenerating and protective coating on cementitious materials by means of an airless pump contains cement, aggregate and synthetic resin emulsion in fixed quantities. It is prepared by mixing the ingredients in a cement mixer until a homogeneous, free-running mortar is obtained followed by pouring it into an agitator with low rpm and agitating until complete utilisation.

8 Claims, No Drawings

MORTAR COMPOSITION FOR APPLICATION OF A REGENERATING AND PROTECTIVE COATING ON CEMENTITIOUS MATERIALS AND PROCESS FOR THE PREPARATION THEREOF

This application is a CIP of PCT/IB96/01450 filed Dec. 18, 1996.

DESCRIPTION

This invention covers a technical innovation in the composition, processing and application of a low thickness hydraulic mortar, with regenerating properties when used on cement, cement concrete and composite material structures. The various properties of the subject mortar make it possible to utilise it in a wide range of circumstances and in many sectors of industry and building, and hydraulic works.

Therefore the present invention relates to the engineering field, particularly to cement and concrete cement buildings and piping works, more particularly to those materials such as coatings and mortars used to confer on cement and concrete endurance properties towards weathering and other chemical and physical agents that tend to substantially deteriorate the building materials with time.

Generally, the employment of fine grained materials which are easily applied is recommended. These generally include coatings and mortars in the form of conglomerates with clasts of ever smaller size. The constraints placed on the ease of applicability of such materials are determined by the size of the particulate matter that is present in them, besides its percentage of the overall volume or weight.

The strive is towards the attainment of formulations capable of forming thinner and thinner layers so that they can fill tiny cracks and crevices that allow materials to be deteriorated faster, and mat structures in such a way as to guarantee a consistent and remarkable protection to the surfaces to which they are applied.

There are known to exist several types of coatings and mortars in the prior art but inherent in them and in the processes for their production there are found to be several inconveniences and flaws.

In EP 0 455 940 there is disclosed a fine mixture particularly recommended for filling small cracks and crevices present in stone building materials, that comprises among its ingredients fine cement, quartz powder, water and polyethylene oxide, and a process for the production thereof. In the mixture quartz particles have an average size of less than 40 mm. The process is rather cumbersome as it involves letting the polymer be embued with water for 24 hours, and two mixing cycles, a high speed and a low speed one, thanks to which two mixtures are obtained and mixed together.

In EP 0 182 543 a very effective coating material for buildings is disclosed, though serious constraints are placed on it by the fact that it is mostly made up of a polymeric material to be obtained by polymerization reactions which are inherently rather lengthy.

In JP 55 007 309 there is found to be disclosed a coating material with marked waterproofing properties. The application of said coating material is heavily penalised by the the fact that it must involve two phases.

In JP 58 029 970 there is disclosed a cement mortar composition which comprises among its components a vinyl acetate resin. Although quick drying and mainly suitable for local applications, it must undergo polishing and cleaning treatments before utilization, decreasing its suitability for coating pipes and drinking water tanks.

A major shortcoming of all the products and processes of the prior art is that the application is time consuming and expensive and the attainment of the materials is cumbersome and elaborated.

Therefore aim of the present invention is to propose a coating material, more particularly a mortar, whose nature is similar to that of the cement and concrete used in buildings, which is easy to apply by means of an airless pump, thus ensuring rapid and economical application with respect to traditional systems. The mortar, applied as described, makes it possibile to obtain a coating of low thickness and which is compact and thus has excellent waterprrofing, adhesive and physical and chemical resistance properties.

The above aim has been accomplished thanks to a cementitious material to be applied onto building materials comprising cement and concrete, and pipes, as a coating or a mortar with regenerating and protective properties towards said materials, characterised by the fact that it comprises a component A consisting of equal ±20% volumetric amounts of cement and quartz sand, and a component B consisting of a resin emulsion obtained by admixture of equal amounts ±20% of synthetic resin and water, said cementitious material further comprising additives.

These and other features will be more readily apparent from the following description of a preferred not limiting embodiment of the invention.

Among its components, the coating, more specifically the mortar, object of the present invention comprises fine quartz powder, a synthetic resin emulsion, emulsified additives and water.

The fine quartz powder is never any bigger than 200 micrometer diameter.

Cement aggregate and emulsion are present in equal amounts plus or minus 20%, while cement aggregate and synthetic emulsion are present in a 1 to 0.3–0.5 volumetric proportion plus or minus 20%.

The mixture object of the present invention is obtained by a process which comprises a first phase wherein cement and quartz sand are dry mixed together; a second phase wherein the cement aggregate obtained is admixed with the synthetic resin emulsion previously obtained by admixture of a synthetic resin with water, and additives, until a homogeneous mixture is obtained; a third stage wherein the mixture is transferred to a low angular speed agitator from which it can be readily employed on a continuous basis, until it has been used up.

The coating, more particularly the mortar, is suitable to be applied with an airless pump, preferably of the diaphragm type with a 115 μm (45 micro inches) nozzle, equipped with an intake filter and modified valves if required.

The invention is now further described by way of the following not limiting examples.

EXAMPLE 1

A sample of polymerised mortar was analysed for ion depletion in acetic acid and carbon dioxide, and it was compared with tolerance limits in drinking water for human consumption as fixed by current laws (TLDW).

Values are expressed in milligrams and, where specified, micrograms.

|  | Acetic Acid | Carbon dioxide | TLDW |
|---|---|---|---|
| Calcium mg/l | 30 | 10 | 100 |
| Magnesium mg/l | 10 | 5 | 50 |
| Sodium mg/l | 40 | 15 | 175 |
| Potash mg/l | 2 | 1 | 10 |
| Aluminium mg/l | 0.1 | 0.05 | 0.2 |
| Iron mg/l | 0.1 | 0.05 | 0.2 |
| Manganese µg/l | 5 | 2 | 50 |
| Copper µg/l | 20 | 10 | 1000 |
| Zinc µg/l | 10 | 5 | 3000 |
| Arsenic µg/l | <0.5 | <0.5 | 50 |
| Cadmium µg/l | <0.5 | <0.5 | 5 |
| Chromium µg/l | <0.5 | <0.5 | 50 |
| Mercury µg/l | <0.1 | <0.1 | 1 |
| Nickel µg/l | <5 | <5 | 50 |
| Lead µg/l | <5 | <5 | 50 |

The very limited depletion makes the mortar object of the present invention extremely suitable not only as a coating for cement and concrete, but also hints it as an extremely suitable material for coating drinking water piping systems.

EXAMPLE 2

A test aimed at better defining the physio-chemical properties of the mortar object of the present invention was carried out.

Analyses were carried out on four asbestos corrugated plate samples coated on both sides with a 1.5 mm thick hydraulic mortar. Endurance to Thermal Shock was evaluated qualitatively.

| Analytical Results. | |
|---|---|
| Melting Point | 1625° C. |
| Thermal Expansion Coefficient mm/° C. | $8.8 \times 10^{-6}$ |
| Mohs Hardness | 6.5 |
| Thermal Shock Resistance | Very Good |
| Unsaturated vapour transpiration at 1.1 bars | 75% |

The present example highlights the fact that the mortar object of the present invention is a good absorbant, increases hardness of the material onto which it is applied, has a good chemical resistance and does not form any vapour barrier, allowing penetration of approximately 75% of it.

The typology of the system in question is determined by:
1) The choice of the particle size of the aggregate of less than 200 micron which, over and above the functional requirements set out must also permit the smooth passage of the mortar through the pump, pipes, valves and an exit nozzle of approximately 45 micro" diameter, without causing excessive wear and tear.
2) Relatively equal quantities in volume or weight of cements, aggregates, additives and resins emulsified in water.
3) Processing achieved by:
    mixing in a cement mixer in order to obtain a homogeneous, free-running mortar;
    transfer to and continued processing in an agitator with low rpm until complete utilisation of the batch;
4) application by means of an airless pump, preferably of the diaphragm type, with a special intake filter and modification of the valves as required, with a nozzle of approximately 45 micro inches (115 µm).

What is claimed is:

1. A cementitious material for application onto at least one member selected from the group consisting of pipes, cement, and concrete as a coating or a mortar with regenerating and protective properties towards said at least one member, said cementitious material comprising a mixture of:
    a Component A consisting of respective volumetric amounts of cement and quartz sand each having a granulometry smaller than or equal to 200 µm, wherein a ratio of said volumetric amounts of cement to quartz sand is 1:1.2–0.8, and
    a Component B consisting of a synthetic resin emulsion obtained by combining volumetric amounts of synthetic resin and water, wherein a ratio of said volumetric amounts of synthetic resin to water is 1:1.2–0.8,
    wherein the volumetric ratio of Component A to Component B ranges between 100 parts component A to 27 parts component B and 100 parts Component A to 55 parts component B.

2. A cementitious material according to claim 1, wherein the volumetric ratio of Component A to Component B ranges between 100 parts component A to 30 parts component B and 100 parts Component A to 50 parts component B.

3. A cementitious material according to claim 1, wherein said cementitious material has cement and quartz sand particles each sized for obtaining layers of said cementitious material by applying said cementitious material with an airless diaphragm pump.

4. A method of producing the cementitious material of claim 1, comprising the steps of:
    A. dry mixing together cement and quartz sand, of a granulometry which is smaller than or equal to 200 µm, to obtain a Component A consisting of the cement and quartz sand;
    B. admixing Component A with a Component B, the Component B consisting of a synthetic resin emulsion obtained previous to step B by admixture of respective volumetric amounts of the synthetic resin with water, wherein a ratio of the volumetric amounts of the synthetic resin and water is 1:0.8–1.2, until a homogeneous mixture is obtained;
    C. transferring the homogeneous mixture to an agitator from which the homogeneous mixture can be readily employed.

5. A cementitious material according to claim 2, wherein said cementitious material has cement and quartz sand particles each sized for obtaining layers of the cementitious material by applying said cementitious material with an airless diaphragm pump.

6. A cementitious material according to claim 1, wherein the cement and quartz sand each have a granulometry smaller than 200 µm.

7. A cementitious material according to claim 1, wherein the cementitious material has cement and quartz sand particles each sized for obtaining layers of the cementitious material by applying the cementitious material with an airless diaphragm pump with a 115 µm nozzle.

8. A cementitious material according to claim 1, wherein the cementitious material has cement and quartz sand particles each sized for obtaining layers of the cementitious material by applying the cementitious material with an airless diaphragm pump with a 115 µm nozzle, equipped with an intake filter.

* * * * *